United States Patent
Liu et al.

(10) Patent No.: US 12,362,888 B2
(45) Date of Patent: Jul. 15, 2025

(54) PHYSICAL SIDELINK FEEDBACK INFORMATION DETERMINING METHOD AND COMMUNICATION DEVICE

(71) Applicant: VIVO MOBILE COMMUNICATION CO., LTD., Dongguan (CN)

(72) Inventors: Siqi Liu, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 350 days.

(21) Appl. No.: 17/868,723

(22) Filed: Jul. 19, 2022

(65) Prior Publication Data
US 2022/0360413 A1   Nov. 10, 2022

Related U.S. Application Data

(63) Continuation of application No. PCT/CN2021/072907, filed on Jan. 20, 2021.

(30) Foreign Application Priority Data

Jan. 20, 2020   (CN) .......................... 202010066285.4

(51) Int. Cl.
*H04L 5/00*   (2006.01)
*H04W 72/02*   (2009.01)
(Continued)

(52) U.S. Cl.
CPC .......... *H04L 5/0055* (2013.01); *H04L 5/0078* (2013.01); *H04W 72/02* (2013.01);
(Continued)

(58) Field of Classification Search
CPC .... H04L 5/0055; H04L 5/0078; H04W 72/25; H04W 72/20; H04W 72/40; H04W 72/02; H04W 72/0446; H04W 92/18
See application file for complete search history.

(56) References Cited

U.S. PATENT DOCUMENTS

| | | | |
|---|---|---|---|
| 11,968,661 B2 * | 4/2024 | Zhao | H04W 72/1263 |
| 12,028,836 B2 * | 7/2024 | Zhao | H04L 1/1812 |
| 2022/0330241 A1 * | 10/2022 | Zhao | H04L 5/0048 |

FOREIGN PATENT DOCUMENTS

| | | |
|---|---|---|
| CN | 110311762 A | 10/2019 |
| CN | 110545533 A | 12/2019 |

(Continued)

OTHER PUBLICATIONS

International Search Report issued in corresponding International Application No. PCT/CN2021/072907, mailed Apr. 13, 2021, 4 pages.
(Continued)

*Primary Examiner* — Chandrahas B Patel
(74) *Attorney, Agent, or Firm* — IPX PLLC

(57) ABSTRACT

A physical sidelink feedback information determining method and a communication device are provided. The method includes: determining target physical sidelink feedback information according to a target sidelink channel transmission resource associated with a target uplink channel, where the target sidelink channel transmission resource is determined according to a first time interval, and the first time interval is a time interval between the target sidelink channel transmission resource and the target uplink channel.

17 Claims, 7 Drawing Sheets

(51) Int. Cl.
   *H04W 72/0446* (2023.01)
   *H04W 72/20* (2023.01)
   *H04W 72/25* (2023.01)
   *H04W 72/40* (2023.01)
   *H04W 92/18* (2009.01)

(52) U.S. Cl.
   CPC ....... *H04W 72/0446* (2013.01); *H04W 72/20* (2023.01); *H04W 72/25* (2023.01); *H04W 72/40* (2023.01); *H04W 92/18* (2013.01)

(56) References Cited

FOREIGN PATENT DOCUMENTS

| WO | 2011079774 A1 | 7/2011 |
|----|---------------|--------|
| WO | 2019137481 A1 | 7/2019 |

OTHER PUBLICATIONS

VIVO, "Remaining Issues on Mode 1 Resource Allocation Mechanism", 3GPP TSG RAN WG1 #100e-Meeting, R1-2000316, Feb. 2020.

NTT DOCOMO, Inc., "Sidelink Resource Allocation Mechanism Mode 1 for NR V2X", 3GPP TSG RAN WG1 #99, R1-1912881, Nov. 2019.

Apple, "On Mode 1 Resource Allocation", 3GPP TSG RAN WG1 #99, R1-1912811, Nov. 9, 2019.

First Office Action issued in related Chinese Application No. 202010066285.4, mailed Jan. 20, 2022, 16 pages.

\* cited by examiner

100

Determine target physical sidelink feedback information according to a target sidelink channel transmission resource associated with a target uplink channel — S102

Determine target physical sidelink feedback information according to a target sidelink channel transmission resource associated with a target uplink channel — S202

Determine target physical sidelink feedback information according to a target sidelink channel transmission resource associated with a target uplink channel — S302

Determine target physical sidelink feedback information according to a target sidelink channel transmission resource associated with a target uplink channel — S402

Determine target physical sidelink feedback information according to a target sidelink channel transmission resource associated with a target uplink channel

Determine, according to a first feedback time and/or a second feedback time, a target sidelink channel transmission resource associated with a target uplink channel

Determine, according to a first feedback time and/or a second feedback time, a target sidelink channel transmission resource associated with a target uplink channel

Determine, according to a first feedback time and/or a second feedback time, a target sidelink channel transmission resource associated with a target uplink channel

FIG. 9

PHYSICAL SIDELINK FEEDBACK INFORMATION DETERMINING METHOD AND COMMUNICATION DEVICE

CROSS-REFERENCE TO RELATED APPLICATIONS

This application is a continuation of International Application No. PCT/CN2021/072907, filed on Jan. 20, 2021, which claims priority to Chinese Patent Application No. 202010066285.4, filed on Jan. 20, 2020. The entire contents of each of the above-identified applications are expressly incorporated herein by reference.

TECHNICAL FIELD

Embodiments of the present disclosure relate to the field of communications, and in particular, to a physical sidelink feedback information determining method and a communication device.

BACKGROUND

In a New Radio (NR) system, for transmission of a downlink data packet, a user can feed back feedback information, that is, HARQ-ACK information, on an uplink resource according to a reception status, to inform a control node whether transmission of the downlink data packet succeeds. To improve the reliability and resource utilization of data transmission on a sidelink, a feedback mechanism is also introduced in a sidelink technology: a sidelink receives physical sidelink feedback information, that is, sidelink HARQ-ACK information fed back by a user after the user receives sidelink data, to indicate whether sidelink transmission succeeds.

In one case, physical sidelink feedback information is determined according to a PSFCH Resource Block (RB) and a time interval Y2 between a Physical Sidelink Feedback Channel (PSFCH) and a Physical Uplink Control Channel (PUCCH). For example, Y2=0 to 15 slots, and there are a plurality of PSFCH RBs in a resource pool, for example, 1 to 275 RBs.

Determining physical sidelink feedback information based on Y2 and PSFCH RBs result in excessively high overheads.

SUMMARY

Embodiments of the present disclosure provide a physical sidelink feedback information determining method and a communication device.

In a first aspect, a physical sidelink feedback information determining method is provided, where the method is performed by a communication device and includes: determining target physical sidelink feedback information according to a target sidelink channel transmission resource associated with a target uplink channel, where the target sidelink channel transmission resource is determined according to a first time interval, and the first time interval is a time interval between the target sidelink channel transmission resource and the target uplink channel.

In a second aspect, a physical sidelink feedback information determining method is provided, where the method is performed by a communication device and includes: determining, according to a first feedback time and/or a second feedback time, a target sidelink channel transmission resource associated with a target uplink channel.

In a third aspect, a communication device is provided, including: a processing module, configured to: determine target physical sidelink feedback information according to a target sidelink channel transmission resource associated with a target uplink channel, where the target sidelink channel transmission resource is determined according to a first time interval, and the first time interval is a time interval between the target sidelink channel transmission resource and the target uplink channel.

In a fourth aspect, a communication device is provided, including: a determining module, configured to: determine, according to a first feedback time and/or a second feedback time, a target sidelink channel transmission resource associated with a target uplink channel.

In a fifth aspect, a communication device is provided, including: a processor, a memory, and a computer program stored in the memory and executable on the processor. When the computer program is executed by the processor, the step in the physical sidelink feedback information determining method provided in the first aspect or the second aspect are implemented.

In a sixth aspect, a computer-readable storage medium is provided. The computer-readable storage medium stores a computer program, and when the computer program is executed by a processor, the steps in the physical sidelink feedback information determining methods in the first aspect and the second aspect are implemented.

According to the physical sidelink feedback information determining method and the communication device provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel, which can effectively reduce overheads of determining physical sidelink feedback information.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a schematic flowchart of a physical sidelink feedback information determining method according to an embodiment of the present disclosure;

FIG. 2 is a schematic flowchart of a physical sidelink feedback information determining method according to another embodiment of the present disclosure;

FIG. 3 is a schematic flowchart of a physical sidelink feedback information determining method according to another embodiment of the present disclosure;

FIG. 4 is a schematic flowchart of a physical sidelink feedback information determining method according to another embodiment of the present disclosure;

FIG. 5a to FIG. 5c are exemplary diagrams of a target sidelink channel transmission resource;

FIG. 6 is a schematic flowchart of a physical sidelink feedback information determining method according to another embodiment of the present disclosure;

FIG. 7 is a schematic flowchart of a physical sidelink feedback information determining method according to another embodiment of the present disclosure;

FIG. 8 is a schematic flowchart of a physical sidelink feedback information determining method according to another embodiment of the present disclosure;

FIG. 9 is a schematic flowchart of a physical sidelink feedback information determining method according to another embodiment of the present disclosure;

DETAILED DESCRIPTION

Figure 5A:
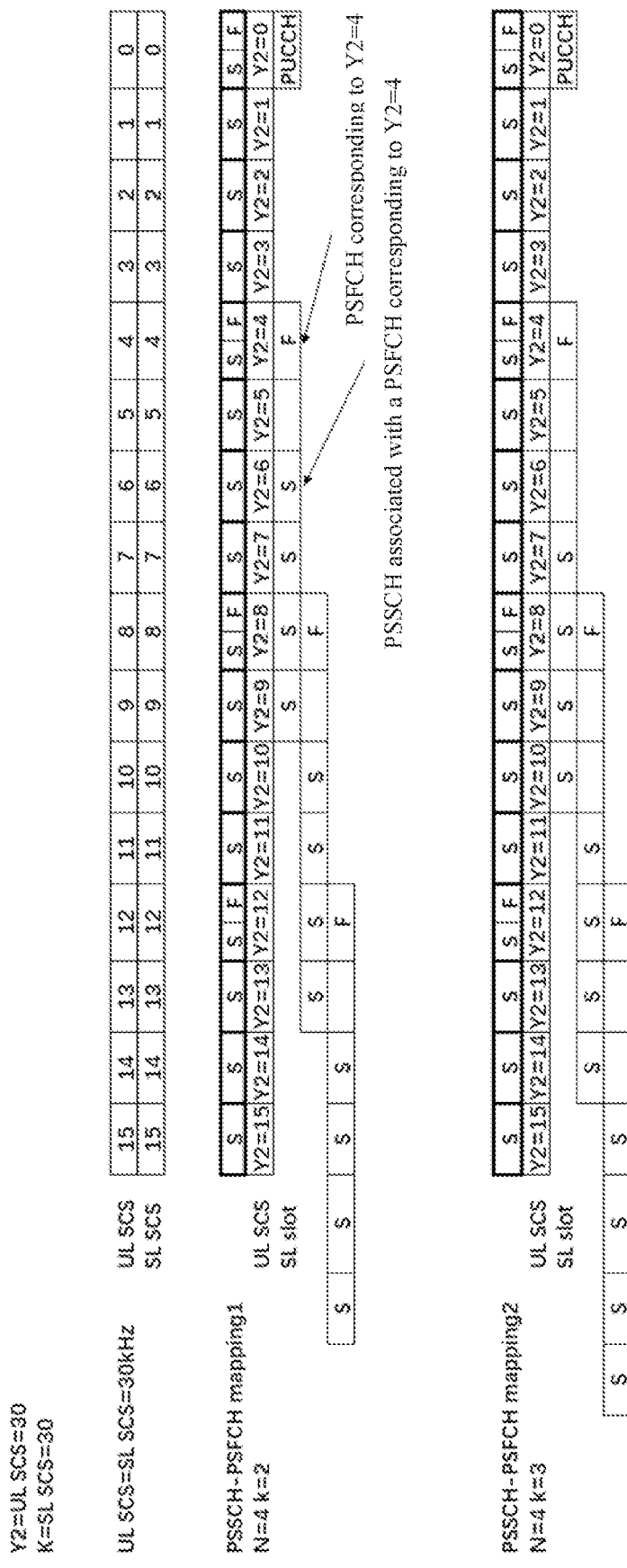

The following describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of the specification indicates at least one of a former one and a latter one.

In embodiments of the present disclosure, a terminal device may include but is not limited to a Mobile Station (MS), a mobile terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), or a computer having a wireless communication function; or the terminal device may be a portable, pocket-sized, handheld, computer built-in, or in-vehicle mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, in an LTE network, the device is referred to as an evolved NodeB (Evolved NodeB, eNB, or eNodeB), and in a 3rd Generation (3G) network, the device is referred to as a NodeB or a network device in the subsequent evolved communications system. However, the terms do not constitute a limitation. The base station can be an LTE base station or an NR base station, the sidelink can be an LTE sidelink or an NR sidelink, the LTE base station can schedule an LTE sidelink and/or an NR sidelink, and the NR base station can also schedule an LTE sidelink and/or an NR sidelink.

Embodiment 1

As shown in FIG. 1, an embodiment of the present disclosure provides a physical sidelink feedback information determining method 100. The method can be executed by a communication device, and the communication device includes: a terminal device and/or a network device. In other words, the method can be performed by software or hardware installed on a terminal device and/or a network device, and the method includes the following steps:

S102: Determine target physical sidelink feedback information according to a target sidelink channel transmission resource associated with a target uplink channel.

The target sidelink channel transmission resource is determined according to a first time interval K1', and the first time interval K1' is a time interval between the target sidelink channel transmission resource and the target uplink channel. The communication device can obtain K1' through configuration or obtain K1' through other methods.

In some embodiments, a plurality of target sidelink channel transmission resources associated with the target uplink channel form a set, and the target physical sidelink feedback information is determined according to the set of target sidelink channel transmission resources. A plurality of K1' forms a set {K1'}, and the set of target sidelink channel transmission resources is determined according to {K1'}. The resource described in the embodiments of the present disclosure may be a resource actually used for transmission, or may be a candidate resource, that is, regardless of whether a resource is actually used for sending and receiving, the resource may be used as the resource described in this embodiment.

In some embodiments, the target sidelink channel includes: a Physical Sidelink Shared Channel (PSSCH) and/or a Physical Sidelink Control Channel (PSCCH). In some embodiments, the target sidelink channel transmission resource may be a PSSCH transmission occasion and/or a PSCCH occasion.

This step is performed by a communication device, and the communication device includes: a terminal device and/or a network device. In this way, it can be ensured that the terminal device and the network device have the same understanding of the target physical sidelink feedback information.

According to the physical sidelink feedback information determining method provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel. The target physical sidelink feedback information can be determined according to the target sidelink channel transmission resource associated with the target uplink channel, instead of a plurality of RBs in a resource pool, which can effectively reduce overheads of determining physical sidelink feedback information, reduce user reporting and coding complexity, and improve the reliability of uplink feedback of sidelink HARQ-ACK.

Embodiment 2

As shown in FIG. 2, an embodiment of the present disclosure provides a physical sidelink feedback information determining method 200. The method can be executed by a communication device, and the communication device includes: a terminal device and/or a network device. In other words, the method can be performed by software or hardware installed on a terminal device and/or a network device, and the method includes the following steps:

S202: Determine target physical sidelink feedback information according to a target sidelink channel transmission resource associated with a target uplink channel.

This step may include the same or similar descriptions as step S102 in the embodiment of FIG. 1, which will not be repeated herein. On this basis, the first time interval K1' is determined according to a second time interval Y2.

Y2 is a time interval between a target PSFCH and the target uplink channel, and one Y2 may correspond to one or more K1'. In some embodiments, a plurality of Y2 may form a set {Y2} of Y2, and {K1'} may be determined according to {Y2}.

In some embodiments, in a case that the communication device in this embodiment is a terminal device, the terminal device may obtain Y2 from a network device, or may obtain Y2 through pre-configuration, other user instructions, or protocol definition. When the communication device in this embodiment is a network device, the network device may configure Y2.

According to the physical sidelink feedback information determining method provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel. The target physical sidelink feedback information can be determined according to the target sidelink channel transmission resource associated with the target uplink channel, instead of a plurality of RBs in a resource pool, which can effectively reduce overheads of determining physical sidelink feedback information, reduce user reporting and coding complexity, and improve the reliability of uplink feedback of sidelink HARQ-ACK.

In addition, in the physical sidelink feedback information determining method provided by the embodiments of the present disclosure, the first time interval is determined according to the second time interval, where the second time interval is a time interval between the target PSFCH and the target uplink channel, and the first time interval can be determined based on the obtained time interval between the target PSFCH and the target uplink channel, which further reduces overheads of determining the physical sidelink feedback information, reduces user reporting and coding complexity, and improves the reliability of uplink feedback of sidelink HARQ-ACK.

Embodiment 3

As shown in FIG. 3, an embodiment of the present disclosure provides a physical sidelink feedback information determining method 300. The method can be executed by a communication device, and the communication device includes: a terminal device and/or a network device. In other words, the method can be performed by software or hardware installed on a terminal device and/or a network device, and the method includes the following steps:

S302: Determine target physical sidelink feedback information according to a target sidelink channel transmission resource associated with a target uplink channel.

The target sidelink channel transmission resource is determined according to K1', and the first time interval is a time interval between the target sidelink channel transmission resource and the target uplink channel. K1' is determined according to Y2, and Y2 is a time interval between a target physical sidelink feedback channel PSFCH and the target uplink channel.

In some embodiments, in a case that there is no PSFCH at a position corresponding to Y2, a target sidelink channel transmission resource corresponding to Y2 does not belong to the target sidelink channel transmission resource, that is, the target sidelink channel transmission resource corresponding to Y2 does not belong to the set of target sidelink channel transmission resources. Specifically, in a case that there is no PSFCH at the location corresponding to Y2, the target sidelink channel transmission resource corresponding to K1' derived based on Y2, for example, a PSSCH and/or PSCCH occasion, does not belong to the target sidelink channel transmission resource, and naturally does not belong to the set of target sidelink channel transmission resources.

In some embodiments, in a case that there is no PSFCH at the position corresponding to Y2, a target sidelink channel transmission resource corresponding to Y2 belongs to the target sidelink channel transmission resource. In other words, the target sidelink channel transmission resource corresponding to Y2 belongs to the set of target sidelink channel transmission resources. Specifically, in a case that there is no PSFCH at the location corresponding to Y2, that is, it can be considered that Y2 corresponds to a virtual PSFCH, the target sidelink channel transmission resource corresponding to K1' derived based on Y2, for example, a PSSCH and/or PSCCH occasion, belongs to the target sidelink channel transmission resource, and naturally belongs to the set of target sidelink channel transmission resources. In some embodiments, in this case, one or more target physical sidelink feedback information bits corresponding to the target sidelink channel transmission resource may all be set to negative acknowledgement NACK or acknowledgement ACK.

For example, assuming {Y2}={1,8}, K=3, N=4, there is a PSFCH at a position Y2=8, and there is no PSFCH at Y2=1, {K1'}={4,5,6, 7, 11, 12, 13, 14}, and a PSSCH occasion within n-{4, 5, 6, 7, 11, 12, 13, 14} is a PSSCH occasion associated with a PUCCH.

According to the physical sidelink feedback information determining method provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel. The target physical sidelink feedback information can be determined according to the target sidelink channel transmission resource associated with the target uplink channel, instead of a plurality of RBs in a resource pool, which can effectively reduce overheads of determining physical sidelink feedback information, reduce user reporting and coding complexity, and improve the reliability of uplink feedback of sidelink HARQ-ACK.

According to the physical sidelink feedback information determining method provided in embodiments of the present disclosure, in a case that there is no PSFCH at a position corresponding to the second time interval, the target sidelink channel transmission resource corresponding to the second time interval belongs to or does not belong to the target sidelink channel transmission resource, so that the target sidelink channel transmission resource can be determined, which can effectively reduce overheads of determining the physical sidelink feedback information, reduce user reporting and coding complexity, and improve the reliability of uplink feedback of sidelink HARQ-ACK.

Embodiment 4

As shown in FIG. 4, an embodiment of the present disclosure provides a physical sidelink feedback information determining method 400. The method can be executed by a communication device, and the communication device includes: a terminal device and/or a network device. In other words, the method can be performed by software or hardware installed on a terminal device and/or a network device, and the method includes the following steps:

S402: Determine target physical sidelink feedback information according to a target sidelink channel transmission resource associated with a target uplink channel.

This step may include the same or similar descriptions as step S102, S202, and S302 in the embodiments of FIG. 1 to FIG. 3, which will not be repeated herein. On this basis, the determining the first time interval K1' according to the second time interval Y2 may include: determining the first time interval K1' according to Y2 and a third time interval between a target sidelink channel and the PSFCH.

In some embodiments, the third time interval is determined according to at least one of a minimum time interval K between the target sidelink channel and the PSFCH and a period N of the PSFCH. N is the period of the PSFCH, that is, a PSFCH resource appears every N time intervals or the time-domain density of the PSFCH is N. In some embodiments, N PSSCHs are associated with the PSFCH.

In some embodiments, one PSFCH may correspond to N PSSCHs, and correspond to K, K+1, K+2, ..., and K+N−1 respectively, that is, the third time interval is determined according to K and N. When there is only one PSSCH and the interval between the PSSCH and the PSFCH is just the minimum value K, it can be understood as N=1. However, when only a PSSCH corresponding to K in the N PSSCHs is sent, the third time interval is determined according to K.

In some embodiments, the determining K1' according to Y2 and the third time interval between the target sidelink channel and the PSFCH includes: determining a sum of Y2 and the third time interval as K1'; determining a sum of Y2 and the third time interval which is scaled up or scaled down as K1'; or determining a sum of the third time interval and the Y2 which is scaled up or scaled down as K1'. The increase or reduction in this step is SCS conversion due to an SCS difference.

For example, in some embodiments, the determining a sum of Y2 and the third time interval as K1' may include:

K1'=gap between a target PSFCH and a target PUCCH (PSFCH−PUCCH gap)+gap between a target PSSCH and a target PSFCH (PSSCH−PSFCH gap)=Y2+(K, K+1, ..., and K+N−1).

Y2 is an element in {Y2}, and values of {Y2} can be traversed to derive {K1'}. {K1'} is a set formed by sums of Y2 and K, K+1, ..., and K+N−1, namely, {Y2+{K, K+1, ..., and K+N−1)}}. In some embodiments, each PSSCH occasion corresponding to K1 corresponds to one HARQ-ACK bit.

In some embodiments, the time interval may be a slot interval. For example, an interval between a PSFCH occasion located in slot m and a PUCCH is Y2, and a corresponding PSSCH occasion is in m−K, m−K−1, ..., and m−K−N+1. Therefore, the interval {K1'} between a PSSCH occasion and a PUCCH is {Y2+K, Y2+K+1, ..., and Y2+K+N−1}. In some embodiments, when there are repeated K1' values in {K1'}, deduplication may be performed. Furthermore, in some embodiments, feedback information is determined based on the deduplicated {K1'}.

The slot interval may be a physical slot interval and/or a logical slot interval. For example, in some embodiments, Y2 is a physical slot interval and N is a logical slot interval. Therefore, the above m−K−N+1 is a logical slot. m−K, m−K−1, ..., and m−K−N+1 represent time positions obtained by offsetting m by a corresponding time of a corresponding logical slot. That is, the third time interval calculated based on K and N can be converted into a physical slot interval, and then summed with Y2. In other words, {K, K+1, ..., K+N−1} in the above formula can be converted into physical slot intervals, and then summed with Y2. For example, in some embodiments, Y2 is defined according to UL SCS, while K and N use SL SCS. In this case, Y2, K, and N can be converted into unified SCSs. For example, Y2, K, and N are converted into UL SCSs or SL SCSs or reference SCSs (for example, a larger value of the SL SCS and the UL SCS, or a preset SCS value), and then summed. In the embodiments of the present disclosure, an example in which Y2 is based on UL SCS and K and N are based on SL SCS is used, but other possible cases are not excluded, and the embodiments of the present disclosure are still applicable.

In some embodiments, the determining a sum of the third time interval and the Y2 which is scaled up or scaled down as K1' may include: K1' may be calculated according to SL SCS, and K1'=PSFCH−PUCCH gap+PSSCH−PSFCH gap=floor(Y2/A)+{K, K+1, ..., and K+N−1}, where Y2 is an element in {Y2}, values of {Y2} can be traversed to derive {K1' }, and the floor function indicates rounding down. When 1<A<M, Y2 is reduced.

In some embodiments, the time interval may be a slot interval. For example, PSSCH occasions corresponding to a PSFCH occasion located in slot m are in m−K, m−K−1, ..., and m−K−N+1. Therefore, intervals between these PSSCH occasions and a PUCCH are {floor(Y2/A)+K, floor(Y2/A)+K+1, ..., and floor(Y2/A)+K+N−1}. In some embodiments, when there are repeated K1' values in {K1'}, deduplication may be performed. Furthermore, in some embodiments, feedback information is determined based on the deduplicated (K1'). In some embodiments, in this case, one PSSCH occasion corresponding to a corresponding position of K1' corresponds to 1 bit.

The slot interval may be a physical slot interval and/or a logical slot interval. For example, Y2 is a physical slot interval and N is a logical slot interval. Then, the third time interval calculated based on K and N can be converted into a physical slot interval, and then summed with the Y2 which is scaled up or scaled down. In other words, {K, K+1, ..., K+N−1} in the above formula can be converted into physical slot intervals, and then summed with the Y2 which is scaled up or scaled down.

In some embodiments, the determining a sum of the third time interval and the Y2 which is scaled up or scaled down as K1' may include:

K1' can be calculated according to SL SCS, and K1'=PSFCH−PUCCH gap+PSSCH−PSFCH gap=Y2*B+{K, K+1, ..., and K+N−1}, where Y2 is an element in {Y2}, values of {Y2} can be traversed to derive {K1'}, and when 1<B<M, Y2 is increased.

In some embodiments, the time interval may be a slot interval. For example, PSSCH occasions corresponding to a PSFCH occasion located in slot m are in m−K, m−K−1, ..., and m−K−N+1. Therefore, intervals between these PSSCH occasions and a PUCCH are $\{Y2*B+K, Y2*B+K+1, \ldots,$ and $Y2*B+K+N-1\}$. In some embodiments, each PSSCH occasion corresponding to K1' may correspond to one HARQ-ACK bit.

In some embodiments, the determining a sum of Y2 and the third time interval which is scaled up or scaled down as K1' may include: K1' may be calculated according to Uu SCS, and K1'=PSFCH–PUCCH gap+PSSCH–PSFCHgap=$Y2+\{(K*A), ((K+1)*A), \ldots,$ and $((K+N-1)*A)\}$.

For example, PSSCH occasions corresponding to a PSFCH occasion located in slot m are in m-(K*A), m-((K+1)*A), ... and m-(K+N-1)*A. Therefore, intervals between these PSSCH occasions and a PUCCH are $\{Y2+(K*A), Y2+((K+1)*A), \ldots,$ and $Y2+((K+N-1)*A)\}$. When 1<A<M, the third time interval is increased.

In some embodiments, when there are repeated K1' values in {K1'}, deduplication may be performed. Furthermore, in some embodiments, feedback information is determined based on the deduplicated {K1'}. In some embodiments, in this case, one PSSCH occasion corresponding to a corresponding position of K1' corresponds to 1 bit.

In some embodiments, the time interval may be a slot interval, and the slot interval may be a physical slot interval and/or a logical slot interval. For example, Y2 is a physical slot interval and N is a logical slot interval. Then, the third time interval which is scaled up or scaled down can be converted into a physical slot interval, and then summed with Y2. In other words, $\{(K*A), ((K+1)*A), \ldots,$ and $((K+N-1)*A)\}$ in the above formula can be converted into physical slot intervals, and then summed with the Y2 which is scaled up or scaled down.

In some embodiments, the determining a sum of Y2 and the third time interval which is scaled up or scaled down as K1' may include: K1' may be calculated according to Uu SCS, and K1'=PSFCH–PUCCH gap+PSSCH–PSFCH gap=$Y2+\{\mathrm{floor}(K/B), \mathrm{floor}((K+1)/B), \ldots,$ and $\mathrm{floor}(K+N-1)/B)\}$, where Y2 is an element in {Y2}, and values of {Y2} can be traversed to derive {K1'}. When 1<B<M, the third time interval is reduced. The Floor function indicates rounding down.

For example, PSSCH occasions corresponding to a PSFCH occasion located at slot m are in m-floor(K/B), m-floor((K+1)/B), ..., and m-floor (K+N-1)/B). Therefore, intervals between these PSSCH occasions and a PUCCH are $\{Y2+\mathrm{floor}(K/B), Y2+\mathrm{floor}((K+1)/B), \ldots,$ and $Y2+\mathrm{floor}(K+N-1)/B)\}$. In this case, a position corresponding to one K1' includes a plurality of PSSCH occasions, and corresponds to a plurality of bits. For example, in some embodiments, each PSSCH occasion corresponding to K1' may correspond to B HARQ-ACK bits.

In some embodiments, the determining K1' according to Y2 and the third time interval between the target sidelink channel and the PSFCH includes at least one of the following implementation manners.

In embodiment 1, when an SL subcarrier spacing (SCS) is the same as an air interface Uu SCS, K1' is the sum of Y2 and the third time interval.

In embodiment 2, in a case that the Uu SCS is a predetermined multiple of the SL SCS, Y2 is scaled up or scaled down according to the predetermined multiple, and K1' is a sum of the Y2 which is scaled up or scaled down and the third time interval, where the predetermined multiple is greater than zero.

In embodiment 3, in a case that the Uu SCS is a predetermined multiple of the SL SCS, the third time interval is scaled up or scaled down according to the predetermined multiple, and K1' is a sum of Y2 and the third time interval which is scaled up or scaled down, where the predetermined multiple is greater than zero.

In embodiment 1, for example, when SL SCS=Uu SCS, K1'=PSFCH–PUCCH gap+PSSCH–PSFCH gap=$Y2+\{K, K+1, \ldots,$ and $K+N-1\}$, where Y2 is an element in {Y2}, and values of {Y2} can be traversed to derive {K1'}. {K1'} is a set formed by sums of Y2 and K, K+1, ..., and K+N-1, namely, $\{Y2+\{K, K+1, \ldots,$ and $K+N-1\}\}$. In some embodiments, each PSSCH occasion corresponding to K1' corresponds to one HARQ-ACK bit.

In some embodiments, the time interval may be a slot interval. For example, an interval between a PSFCH occasion located in slot m and a PUCCH is Y2, and a corresponding PSSCH occasion is in m-K, m-K-1, ..., and m-K-N+1. Therefore, the interval {K1'} between a PSSCH occasion and a PUCCH is $\{Y2+K, Y2+K+1, \ldots$ and $Y2+K+N-1\}$. In some embodiments, when there are repeated K1' values in {K1'}, deduplication may be performed. Furthermore, in some embodiments, feedback information is determined based on the deduplicated {K1'}.

The slot interval may be a physical slot interval and/or a logical slot interval. For example, in some embodiments, Y2 is a physical slot interval and N is a logical slot interval. Therefore, the above m-K, m-K-1, ..., and m-K-N+1 are logical slots. m-K, m-K-1, ..., and m-K-N+1 represent time positions obtained by offsetting m by a corresponding time of a corresponding logical slot. That is, the third time interval calculated based on K and N can be converted into a physical slot interval, and then summed with Y2. In other words, {K, K+1, ..., K+N-1} in the above formula can be converted into physical slot intervals, and then summed with Y2. For example, in some embodiments, Y2 is defined according to UL SCS, while K and N use SL SCS. In this case, they can be converted into unified SCSs. For example, Y2, K, and N are converted into UL SCSs or SL SCSs or reference SCSs (for example, a larger value of the SL SCS and the UL SCS, or a preset SCS value), and then summed. In the present disclosure, an example in which Y2 is based on UL SCS and K and N are based on SL SCS is used, but other possible cases are not excluded, and the present disclosure is still applicable.

In embodiment 2, for example, the increase or reduction in this step is conversion due to a difference between a Uu SCS and an SL SCS. For example, in some embodiments, Y2 is defined according to UL SCS, while K and N use SL SCS. In this case, they can be converted into unified SCSs. For example, Y2, K, and N are converted into UL SCSs or SL SCSs or reference SCSs (for example, a larger value of the SL SCS and the UL SCS, or a preset SCS value), and then summed. In the present disclosure, an example in which Y2 is based on UL SCS and K and N are based on SL SCS is used, but other possible cases are not excluded, and the present disclosure is still applicable.

When Uu SCS=A*SL SCS, in some embodiments, K1' can be calculated according to SL SCS, and K1'=PSFCH–PUCCH gap+PSSCH–PSFCH gap=$\mathrm{floor}(Y2/A)+\{K, K+1, \ldots,$ and $K+N-1\}$, where Y2 is an element in {Y2}, values of {Y2} can be traversed to derive {K1'}, and the floor function indicates rounding down. When 1<A<M, Y2 is reduced. In some embodiments, the time interval may be a slot interval. For example, PSSCH occasions corresponding to a PSFCH occasion located in slot m are in m-K, m-K-1, ..., and m-K-N+1. Therefore, intervals between these PSSCH occasions and a PUCCH are $\{\mathrm{floor}(Y2/A)+K, \mathrm{floor}(Y2/A)+K+1, \ldots,$ and $\mathrm{floor}(Y2/A)+K+N-1\}$. In some embodiments, when there are repeated K1' values in {K1'}, deduplication may be performed. Furthermore, in some embodiments, feedback information is determined based on the deduplicated {K1'}. In some embodiments, in this case, one PSSCH occasion corresponding to a corresponding position of K1' corresponds to 1 bit.

The slot interval may be a physical slot interval and/or a logical slot interval. For example, Y2 is a physical slot interval and N is a logical slot interval. Then, the third time interval calculated based on K and N can be converted into a physical slot interval, and then summed with the Y2 which is scaled up or scaled down. In other words, {K, K+1, . . . , K+N−1} in the above formula can be converted into physical slot intervals, and then summed with the Y2 which is scaled up or scaled down.

When SL SCS=B*Uu SCS, that is, Uu SCS=1/B SL SCS, in some embodiments, K1' can be calculated according to SL SCS, and K1'=PSFCH−PUCCH gap+PSSCH−PSFCH gap=Y2*B+{K, K+1, . . . , and K+N−1}. Y2 is an element in {Y2}, values of {Y2} can be traversed to derive {K1'}, and when 1<B<M, Y2 is increased.

In some embodiments, the time interval may be a slot interval. For example, PSSCH occasions corresponding to a PSFCH occasion located in slot m are in m-K, m-K−1, . . . , and m-K−N+1. Therefore, intervals between these PSSCH occasions and a PUCCH are {Y2*B+K, Y2*B+K+1, . . . , and Y2*B+K+N−1}. In some embodiments, each PSSCH occasion corresponding to K1 may correspond to one HARQ-ACK bit.

In embodiment 3, for example, the increase or reduction in this step is conversion due to a difference between a Uu SCS and an SL SCS. For example, in some embodiments, Y2 is defined according to UL SCS, while K and N use SL SCS. In this case, they can be converted into unified SCSs. For example, Y2, K, and N are converted into UL SCSs or SL SCSs or reference SCSs (for example, a larger value of the SL SCS and the UL SCS, or a preset SCS value), and then summed. In the present disclosure, an example in which Y2 is based on UL SCS and K and N are based on SL SCS is used, but other possible cases are not excluded, and the present disclosure is still applicable.

When Uu SCS=A*SL SCS, K1' can be calculated according to Uu SCS, and K1'=PSFCH−PUCCH gap+PSSCH−PSFCH gap=Y2+{(K*A), ((K+1)*A), . . . , and ((K+N−1)*A)}.

For example, PSSCH occasions corresponding to a PSFCH occasion located in slot m are in m−(K*A), m−((K+1)*A), . . . , and m−(K+N−1)*A. Therefore, intervals between these PSSCH occasions and a PUCCH are {Y2+(K*A), Y2+((K+1)*A), . . . , and Y2+((K+N−1)*A)}. When 1<A<M, the third time interval is increased. In some embodiments, when there are repeated K1' values in {K1'}, deduplication may be performed. Furthermore, in some embodiments, feedback information is determined based on the deduplicated {K1'}. In some embodiments, in this case, one PSSCH occasion corresponding to a corresponding position of K1' corresponds to 1 bit.

In some embodiments, the time interval may be a slot interval, and the slot interval may be a physical slot interval and/or a logical slot interval. For example, Y2 is a physical slot interval and N is a logical slot interval. Then, the third time interval which is scaled up or scaled down can be converted into a physical slot interval, and then summed with Y2. In other words, {(K*A), ((K+1)*A), . . . , and ((K+N−1)*A)} in the above formula can be converted into physical slot intervals, and then summed with the Y2 which is scaled up or scaled down.

When SL SCS=B*Uu SCS, that is, Uu SCS=1/B SL SCS, in some embodiments, K1' can be calculated according to Uu SCS, and K1'=PSFCH−PUCCH gap+PSSCH−PSFCH gap=Y2+{floor (K/B), floor((K+1)/B), . . . , and floor(K+N−1)/B)}, where Y2 is an element in {Y2}, and values of {Y2} can be traversed to derive {K1' }. When 1<B<M, the third time interval is reduced. The Floor function indicates rounding down.

For example, PSSCH occasions corresponding to a PSFCH occasion located at slot m are in m-floor(K/B), m-floor((K+1)/B), . . . , and m-floor (K+N−1)/B). Therefore, intervals between these PSSCH occasions and a PUCCH are {Y2+floor(K/B), Y2+floor((K+1)/B), . . . , and Y2+floor(K+N−1)/B)}. In this case, a position corresponding to one K1' includes a plurality of PSSCH occasions, and corresponds to a plurality of bits. For example, in some embodiments, each PSSCH occasion corresponding to K1' corresponds to B HARQ-ACK bits.

The Uu SCS may be an SCS of an uplink, a downlink, an uplink resource, or a downlink resource.

In some embodiments, a start point of n-Y2 is a start point of a slot that overlaps with a PSFCH and is not earlier than a PSFCH and is calculated according to the Uu SCS.

For embodiments 1 to 3, the following examples are given for description.

FIG. 5a is an exemplary diagram of a target sidelink channel transmission resource. As shown in the figure, for example, PUCCH SCS=SL SCS=30 kHz. In a first case, assuming {Y2}={1,2,4,8} and K=2 and N=4, since there is a PSFCH at a position of Y2={4,8}, {K1'}={6,7,8,9,10,11,12,13}, and a PSSCH occasion within n-{6,7,8,9,10,11,12,13} is a PSSCH occasion associated with the PUCCH.

In a second case, assuming {Y2}={1,2,4,8} and K=3 and N=4, since there is a PSFCH at a position of Y2={4,8}, {K1'}={7,8,9,10,11,12,13,14}, and a PSSCH occasion within n-{7,8,9,10,11,12,13,14} is a PSSCH occasion associated with the PUCCH.

Figure 5B:
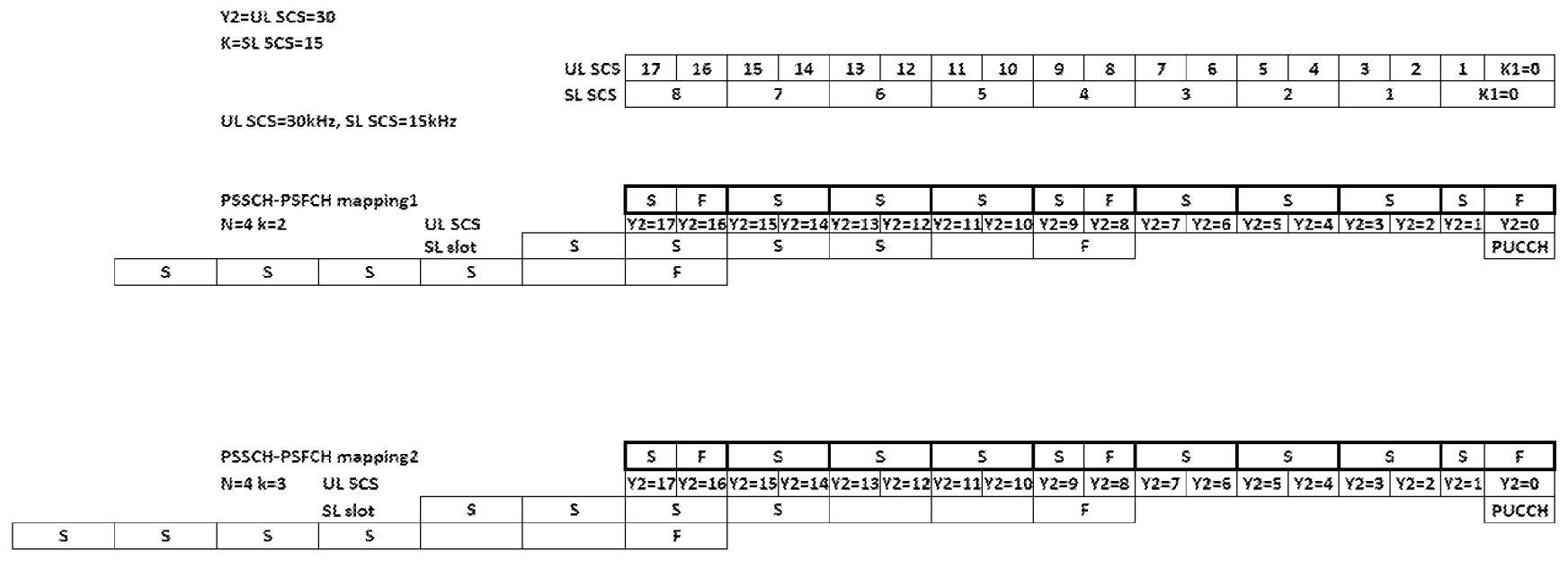

FIG. 5b is an exemplary diagram of a target sidelink channel transmission resource. As shown in the figure, when Uu SCS is greater than SL SCS, for example, PUCCH SCS=30 kHz and SL SCS=15 kHz, an implementation manner is that K1' is calculated according to SL SCS. In example 1, assuming {Y2}={8} and K=2 and N=4, {K1'}={6,7,8,9}, and a PSSCH occasion within n-{6,7,8,9} is a PSSCH occasion associated with the PUCCH. In example 2, assuming {Y2}={8} and K=3 and N=4, {K1'}={7,8,9,10}, and a PSSCH occasion within n-{7,8,9, 10} is a PSSCH occasion associated with the PUCCH.

In some embodiments, K1' is calculated according to UL SCS. In example 1, assuming {Y2}={8} and K=2 and N=4, {K1'}={12,14,16,18}, and a PSSCH occasion within n-{12, 14,16,18} is a PSSCH occasion associated with the PUCCH. In embodiment 2, assuming {Y2}={8} and K=3 and N=4, {K1'}={14,16,18,20}, and a PSSCH occasion within n-{14, 16,18,20} is a PSSCH occasion associated with the PUCCH. In some embodiments, the PSSCH occasion within n-{12, 14,16,18} may be a PSSCH occasion in a sidelink slot overlapping the time of n-{12,14,16,18}.

Figure 5C:
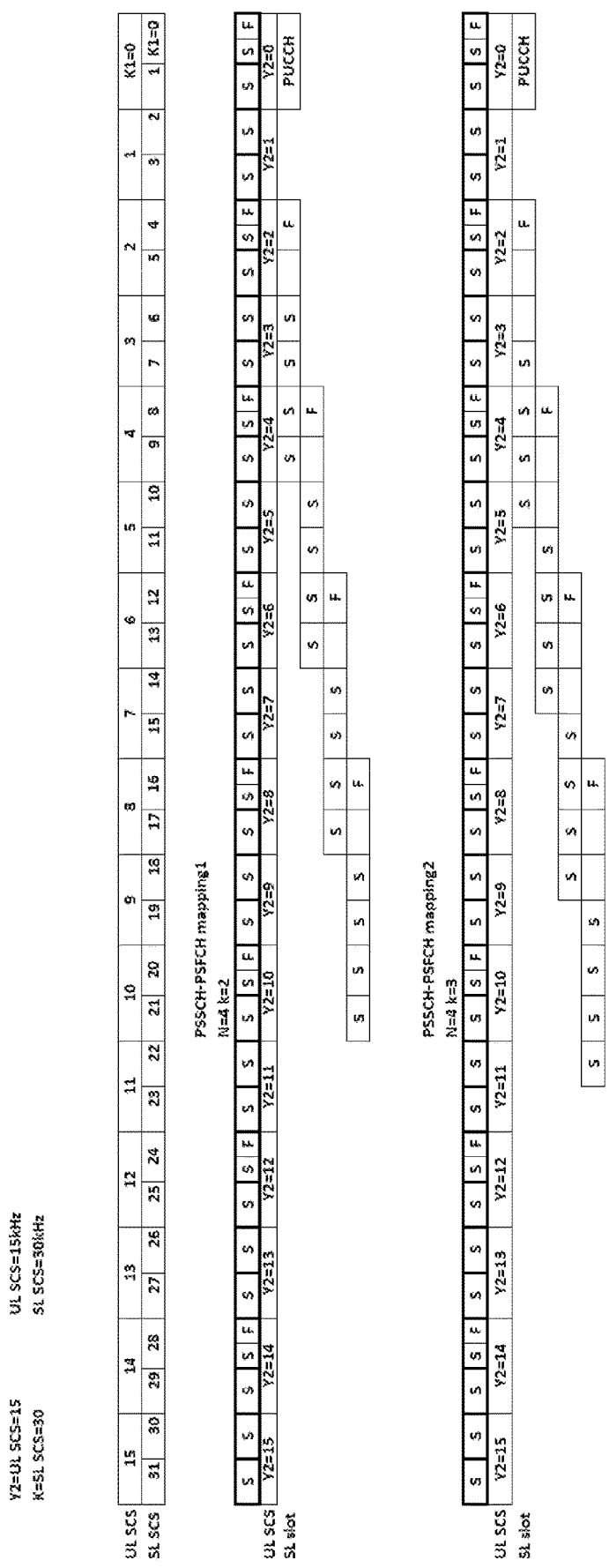

FIG. 5c is an exemplary diagram of a target sidelink channel transmission resource. As shown in the figure, when Uu SCS is less than SL SCS, for example, UL SCS=15 kHz and SL SCS=30 kHz, an implementation manner is that K1' is calculated according to SL SCS. In example 1, assuming {Y2}={2} and K=2 and N=4, {K1'}={6,7,8,9}, and a PSSCH occasion within n-{6,7,8,9} is a PSSCH occasion associated with the PUCCH. In example 2, assuming {Y2}={2} and K=3 and N=4, {K1'}={7,8,9,10}, a PSSCH occasion within n-{7,8,9,10} is a PSSCH occasion associated with the PUCCH.

K1' is calculated according to UL SCS. In example 1, assuming {Y2}={2} and K=2 and N=4, {K1'}={3,4}, and a PSSCH occasion within n-{3,4} is a PSSCH occasion associated with the PUCCH. In example 2, assuming {Y2}={2} and K=3 and N=4, {K1'}={3,4,5}, and a PSSCH occasion within n-{3,4,5} is a PSSCH occasion associated with the PUCCH.

According to the physical sidelink feedback information determining method provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel. The target physical sidelink feedback information can be determined according to the target sidelink channel transmission resource associated with the target uplink channel, instead of a plurality of RBs in a resource pool, which can effectively reduce overheads of determining physical sidelink feedback information, reduce user reporting and coding complexity, and improve the reliability of uplink feedback of sidelink HARQ-ACK.

In the physical sidelink feedback information determining method provided by the embodiments of the present disclosure, by determining the first time interval according to the second time interval and the third time interval between the target sidelink channel and the PSFCH, the first time interval can be determined, to reduce overheads of determining the physical sidelink feedback information.

Embodiment 5

As shown in FIG. 6, an embodiment of the present disclosure provides a physical sidelink feedback information determining method 600. The method can be executed by a communication device, and the communication device includes: a terminal device and/or a network device. In other words, the method can be performed by software or hardware installed on a terminal device and/or a network device, and the method includes the following steps:

S602: Determine target physical sidelink feedback information according to a target sidelink channel transmission resource associated with a target uplink channel.

The target sidelink channel transmission resource is determined according to K 1', and K1' is a time interval between the target sidelink channel transmission resource and the target uplink channel.

In some embodiments, the determining the target physical sidelink feedback information includes: determining the target sidelink feedback information according to feedback information corresponding to the target sidelink channel transmission resource. For example, feedback information corresponding to each target sidelink channel transmission resource may be cascaded to obtain the target sidelink feedback information.

In some embodiments, before determining the target physical sidelink feedback information, the method further includes: determining, according to at least one dimension of the target sidelink channel transmission resource, the feedback information corresponding to the target sidelink channel transmission resource, where the at least one dimension of the target sidelink channel transmission resource includes: at least one of the frequency domain, code domain, spatial domain, or time domain.

For example, for each PSSCH occasion in the set, frequency domain*code domain*space domain dimension=M, that is, it is assumed that one user can send at most M PSSCHs in one PSSCH occasion. In this case, for each PSSCH occasion corresponding to K1', M sidelink HARQ-ACKs are fed back. In this way, a size of physical sidelink feedback information corresponding to a transmission resource can be determined.

On this basis, in some embodiments, when B HARQ-ACK bits are fed back in each PSSCH occasion corresponding to K1', M*B sidelink HARQ-ACKs may be fed back. In this way, a size of physical sidelink feedback information corresponding to the target physical sidelink can be determined.

According to the physical sidelink feedback information determining method provided in embodiments of the present disclosure, the target physical sidelink feedback information is determined according to the target sidelink channel transmission resource associated with the target uplink channel, where the target sidelink channel transmission resource is determined according to the first time interval, and the first time interval is a time interval between the target sidelink channel transmission resource and the target uplink channel. The target physical sidelink feedback information can be determined according to the target sidelink channel transmission resource associated with the target uplink channel, instead of a plurality of RBs in a resource pool, which can effectively reduce overheads of determining physical sidelink feedback information, reduce user reporting and coding complexity, and improve the reliability of uplink feedback of sidelink HARQ-ACK.

According to the physical sidelink feedback information determining method provided in embodiments of the present disclosure, the target sidelink feedback information is determined according to the feedback information corresponding to the target sidelink channel transmission resource, which can effectively reduce overheads of determining the physical sidelink feedback information, reduce user reporting and coding complexity, and improve the reliability of uplink feedback of sidelink HARQ-ACK.

According to the physical sidelink feedback information determining method provided in embodiments of the present disclosure, the feedback information corresponding to the target sidelink channel transmission resource is determined according to at least one dimension of the target sidelink channel transmission resource, so that the feedback information corresponding to the target sidelink channel transmission resource can be determined according to a plurality of dimensions, which can effectively reduce overheads of determining the physical sidelink feedback information, reduce user reporting and coding complexity, and improve the reliability of uplink feedback of sidelink HARQ-ACK.

In addition, for example, in this embodiment of the present disclosure, the target uplink channel is associated with at least one target resource, where the target resource includes a resource pool, a subchannel, a BandWidth Part (BWP), or a carrier.

It can be understood that the target sidelink channel transmission resource associated with the target uplink channel may belong to a same target resource, may belong to a same group of target resources, or may be associated with any target resource. That is, on the target uplink channel, only SL HARQ feedback information corresponding to the target sidelink channel transmission resource in one specified target resource may be fed back; or SL HARQ feedback information corresponding to the target sidelink channel transmission resource in some specified target resources may be fed back; or SL HARQ feedback information corresponding to the target sidelink channel transmission resource in any target resource may be fed back.

In some embodiments, a manner in which the target uplink channel is associated with at least one target resource includes at least one of the following:

(1) The target uplink channel is associated with an identifier (Identifier, ID) of one or more target resources of the at least one target resource.

In some embodiments, the target uplink channel is associated with an Identifier (ID) of one or more target resources in the at least one target resource. An ID of each target resource may be indicated by control signaling or higher layer signaling, and the higher layer signaling may include at least one of RRC signaling, Packet Data Convergence Protocol (PDCP) signaling, Service Data Adaptation Protocol (SDAP) signaling, Radio Link Control (RLC) signaling, Medium Access Control (MAC) signaling, and the like.

(2) A resource set of the target uplink channel is associated with an ID of one or more target resources of the at least one target resource.

In some embodiments, the resource set of the target uplink channel is associated with the ID of one or more target resources of the at least one target resource.

(3) A format of the target uplink channel is associated with an ID of one or more target resources of the at least one target resource.

In some embodiments, the format of the target uplink channel is associated with the ID of one or more target resources of the at least one target resource.

(4) A sequence of the target uplink channel is associated with one or more target resources of the at least one target resource.

In some embodiments, the sequence of the target uplink channel is associated with the ID of one or more target resources of the at least one target resource. The sequence of the target uplink channel includes at least one of a base sequence, an initialization sequence, a cyclic shift sequence, a phase rotation sequence, and the like.

(5) A frequency domain resource of the target uplink channel is associated with one or more target resources of the at least one target resource. In some embodiments, the frequency domain resource of the target uplink channel is associated with the ID of one or more target resources of the at least one target resource.

(6) A time domain resource of the target uplink channel is associated with one or more target resources of the at least one target resource. In some embodiments, the time domain resource of the target uplink channel is associated with the ID of one or more target resources of the at least one target resource.

(7) A frequency hopping pattern of the target uplink channel is associated with one or more target resources of the at least one target resource.

In some embodiments, the frequency hopping pattern of the target uplink channel is associated with the ID of one or more target resources of the at least one target resource. The frequency hopping pattern is used for a communication device to perform frequency hopping.

In some embodiments, the target uplink channel is associated with a target sidelink channel resource, and the target sidelink channel resource includes at least one of a PSFCH resource, a PSSCH resource, and a PSCCH resource. In some following examples, the PSFCH resource is used as an example for description, but it does not mean that the target sidelink channel resource must be a PSFCH resource.

In some embodiments, for example, the target sidelink channel resource includes at least one resource outside a sidelink channel resource corresponding to the at least one target resource.

In some embodiments, for example, all SL HARQ feedback information corresponding to at least one resource outside the sidelink channel resource corresponding to the at least one target resource is one of acknowledgment ACK information and negative acknowledgment NACK information.

For example, a PUCCH is associated with resource pool #1, and the PUCCH is associated with 4 PSFCH occasions #1, #2, #3, and #4. Occasion #3 in the 4 PSFCH occasions belongs to resource pool #2, and the other three occasions belong to resource pool #1. Then, when a PUCCH is used to feed back HARQ-ACK bits of the 4 PSFCH occasions, HARQ-ACK bits corresponding to occasion #3 are all set to ACK information.

In another example, a PUCCH is associated with resource pool #1, and the PUCCH is associated with 4 PSFCH occasions #1, #2, #3, and #4. Occasion #3 in the 4 PSFCH occasions belongs to resource pool #2, and the other three occasions belong to resource pool #1. Then, when a PUCCH is used to feed back HARQ-ACK bits of the 4 PSFCH occasions, HARQ-ACK bits corresponding to occasion #3 are all set to NACK information.

Furthermore, in some embodiments, the target sidelink channel transmission resource associated with the target uplink channel may include at least one resource outside the sidelink channel resource corresponding to the at least one target resource.

It can be understood that a resource that does not belong to the sidelink channel resource corresponding to at least one target resource associated with the target uplink channel (that is, at least one resource outside the sidelink channel resource corresponding to the at least one target resource) may belong to the target sidelink channel transmission resource associated with the target uplink channel.

In some embodiments, in another specific example, the target sidelink channel resource is a resource within a sidelink channel resource corresponding to the at least one target resource.

Furthermore, in some embodiments, the target sidelink channel transmission resource associated with the target uplink channel is at least one resource within the sidelink channel resource corresponding to the at least one target resource.

It can be understood that a resource that does not belong to the sidelink channel resource corresponding to at least one target resource associated with the target uplink channel (that is, at least one resource outside the sidelink channel resource corresponding to the at least one target resource) does not belong to the target sidelink channel transmission resource associated with the target uplink channel either.

In some embodiments, in the SL feedback information determining method in the embodiments of the present disclosure, the target sidelink channel resources associated with the target uplink channel are grouped according to the target resources. For example, resources associated with all target resources or corresponding SL HARQ-ACK bits are sequentially cascaded according to IDs of the target resources.

In the embodiments of the present disclosure, at least one target resource associated with the target uplink channel can be determined, and SL HARQ feedback information that needs to be reported by a user on a sidelink can be determined based on the association relationship, and can be mapped to the target uplink channel to complete reporting of the SL HARQ feedback information. The target resource may include a resource pool, a subchannel, a BWP, or a carrier. In this way, the technical solutions described in the embodiments of the present disclosure can help the user on a sidelink to accurately determine content of the SL feedback information that needs to be reported, so as to help the user on the sidelink to report the SL feedback information smoothly to be consistent with understanding of the control node.

Embodiment 6

As shown in FIG. 7, an embodiment of the present disclosure provides a physical sidelink feedback information determining method 700. The method can be executed by a communication device, and the communication device includes: a terminal device and/or a network device. In other words, the method can be performed by software or hardware installed on a terminal device and/or a network device, and the method includes the following steps:

S702: Determine, according to a first feedback time and/or a second feedback time, a target sidelink channel transmission resource associated with a target uplink channel.

Therefore, sidelink transmission can be performed on the target sidelink channel transmission resource, thereby improving the reliability of sidelink transmission.

In addition, the target sidelink channel transmission resource may be used to determine target physical sidelink feedback information.

In some embodiments, the target sidelink channel includes: at least one of a PSSCH, a PSCCH, or a PSFCH.

In some embodiments, the first feedback time T and the second feedback time L may be configured, pre-configured, indicated by other users, or defined through writing.

It can be understood that, this embodiment may be implemented independently, or may be implemented in combination with at least one of embodiments 1 to 5.

Therefore, according to the physical sidelink feedback information determining method provided in embodiments of the present disclosure, the target sidelink channel transmission resource associated with the target uplink channel is determined according to the first feedback time and/or the second feedback time, where the target sidelink channel transmission resource is used to determine the target physical sidelink feedback information, which can effectively reduce overheads of determining the physical sidelink feedback information, reduce user reporting and coding complexity, and improve the reliability of uplink feedback of sidelink HARQ-ACK.

Embodiment 7

As shown in FIG. 8, an embodiment of the present disclosure provides a physical sidelink feedback information determining method 800. The method can be executed by a communication device, and the communication device includes: a terminal device and/or a network device. In other words, the method can be performed by software or hardware installed on a terminal device and/or a network device, and the method includes the following steps:

S802: Determine, according to a first feedback time and/or a second feedback time, a target sidelink channel transmission resource associated with a target uplink channel.

In some embodiments, the target sidelink channel includes: at least one of a PSSCH, a PSCCH, or a PSFCH.

In some embodiments, the determining, according to a first feedback time and/or a second feedback time, a target sidelink channel transmission resource corresponding to a target uplink channel includes: at least one of the following embodiments:

In a first embodiment, the target sidelink channel transmission resource corresponding to the target uplink channel is determined according to a resource location of the target uplink channel and the first feedback time. For example, in a PUCCH/PUSCH of slot n, sidelink HARQ-ACK feedback information is determined based on a corresponding slot at the time of n-T.

In a second embodiment, a feedback time period is determined according to a resource location of the target uplink channel, the first feedback time, and the second feedback time, and the target sidelink channel transmission resource corresponding to the target uplink channel is determined according to the feedback time period.

For example, in a PUCCH/PUSCH of slot n, sidelink HARQ-ACK feedback information is determined based on a feedback time period not later than the time of n-T.

In some embodiments, in a case that the target sidelink channel transmission resource corresponding to the target uplink channel is determined according to the feedback time period, each target time in the feedback time period corresponds to at least one target physical sidelink feedback information bit. In some embodiments, each slot in the feedback time period corresponds to X sidelink HARQ-ACK bits. For example, T=1 and L=6, and each slot corresponds to X bits in the feedback time period from n-6 to n-1.

On this basis, in some embodiments, in the target time, the target sidelink channel transmission resource is included. In the feedback time period, each slot containing PSFCH occasion corresponds to X sidelink HARQ-ACK bits. For example, if T=1 and L=6, one slot includes a PSFCH occasion from the n-6 to n-1 slots and corresponds to X bits.

In some embodiments, the sidelink HARQ-ACK feedback information is determined in the feedback time or the feedback time period based on the associated PSFCH occasion or PSSCH occasion set determined in the embodiment of FIG. 1. For example, if T=1, L=6, and Y2={1,4,6,8}, a slot corresponding to Y2={4,6} is in the feedback time period, a corresponding PSFCH occasion or PSSCH occasion belongs to the associated PSFCH occasion or PSSCH occasion set, and the sidelink HARQ-ACK feedback information is determined according to the embodiment of FIG. 1.

In a third embodiment, a feedback time period is determined according to a resource location of the target uplink channel and the second feedback time, and the target sidelink channel transmission resource corresponding to the target uplink channel is determined according to the feedback time period.

In some embodiments, in a case that the target sidelink channel transmission resource corresponding to the target uplink channel is determined according to the feedback time period, each target time in the feedback time period corresponds to at least one target physical sidelink feedback information bit. In some embodiments, in the target time, the target sidelink channel transmission resource is included. For example, each slot including the PSFCH occasion in the feedback time period corresponds to X sidelink HARQ-ACK bits.

Therefore, sidelink transmission can be performed on the determined target sidelink channel transmission resource, thereby improving the reliability of sidelink transmission.

In addition, the target sidelink channel transmission resource may be used to determine target physical sidelink feedback information.

It can be understood that, this embodiment may be implemented independently, or may be implemented in combination with at least one of embodiments 1 to 5.

Therefore, according to the physical sidelink feedback information determining method provided in embodiments of the present disclosure, the target sidelink channel transmission resource associated with the target uplink channel is determined according to the first feedback time and/or the second feedback time, where the target sidelink channel transmission resource is used to determine the target physical sidelink feedback information, which can effectively reduce overheads of determining the physical sidelink feedback information, reduce user reporting and coding complexity, and improve the reliability of uplink feedback of sidelink HARQ-ACK.

Embodiment 8

As shown in FIG. 9, an embodiment of the present disclosure provides a physical sidelink feedback information determining method 900. The method can be executed by a communication device, and the communication device includes: a terminal device and/or a network device. In other words, the method can be performed by software or hardware installed on a terminal device and/or a network device, and the method includes the following steps:

S902: Determine, according to a first feedback time and/or a second feedback time, a target sidelink channel transmission resource associated with a target uplink channel.

In some embodiments, the target sidelink channel includes: at least one of a PSSCH, a PSCCH, or a PSFCH.

The target sidelink channel transmission resource is determined according to K1', and K1' is a time interval between the target sidelink channel transmission resource and the target uplink channel. The embodiment is similar to that in Embodiment 1, and details are not repeated herein.

In some embodiments, K1' is determined according to Y2, and Y2 is a time interval between a target physical sidelink feedback channel PSFCH and the target uplink channel. A specific implementation is similar to that in at least one of embodiments 2 to 4, and details are not repeated herein.

In some embodiments, the first time interval K1' and/or the second time interval Y2 may be obtained according to the first feedback time and/or the second feedback time, so that the target sidelink channel transmission resource determined according to K1' and/or the second time interval Y2 belongs to the target sidelink channel transmission resource corresponding to the target uplink channel determined in the previous embodiment.

In other words, this embodiment may be implemented independently, or may be implemented in combination with at least one of embodiments 1 to 5.

In another embodiment, the target sidelink channel transmission resource is determined according to a fourth time interval, and the fourth time interval is a time interval between a target physical sidelink shared channel PSSCH and the target uplink channel, or a time interval between a target physical sidelink control channel PSCCH and the target uplink channel.

Therefore, sidelink transmission can be performed on the determined target sidelink channel transmission resource, thereby improving the reliability of sidelink transmission.

In addition, the target sidelink channel transmission resource may be used to determine target physical sidelink feedback information.

Therefore, according to the physical sidelink feedback information determining method provided in embodiments of the present disclosure, the target sidelink channel transmission resource associated with the target uplink channel is determined according to the first feedback time and/or the second feedback time, where the target sidelink channel transmission resource is used to determine the target physical sidelink feedback information, which can effectively reduce overheads of determining the physical sidelink feedback information, reduce user reporting and coding complexity, and improve the reliability of uplink feedback of sidelink HARQ-ACK.

Embodiment 9

Figure 10:
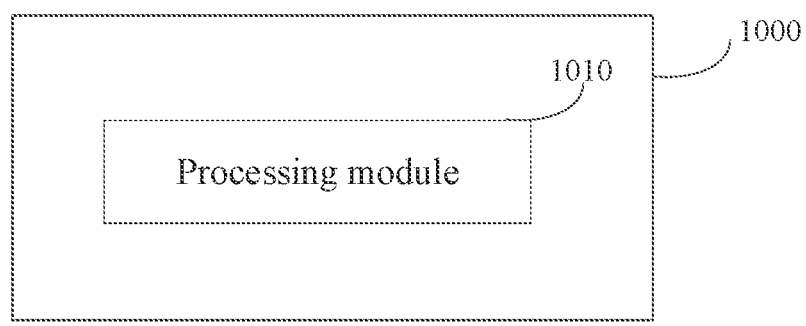
FIG. 10 is a schematic structural diagram of a communication device according to an embodiment of the present disclosure.

FIG. 10 is a schematic structural diagram of a communication device according to an embodiment of the present disclosure. As shown in the figure, the communication device 1000 includes: a processing module 1010.

The processing module 1010 is configured to: determine target physical sidelink feedback information according to a target sidelink channel transmission resource associated with a target uplink channel, where the target sidelink channel transmission resource is determined according to a first time interval, and the first time interval is a time interval between the target sidelink channel transmission resource and the target uplink channel.

In some embodiments, the first time interval is determined according to a second time interval, and the second time interval is a time interval between a target PSFCH and the target uplink channel.

In some embodiments, the determining the first time interval according to the second time interval includes: determining the first time interval according to the second time interval and a third time interval between a target sidelink channel and the PSFCH.

In some embodiments, the third time interval is determined according to at least one of a minimum time interval between the target sidelink channel and the PSFCH and a period of the PSFCH.

In some embodiments, the determining the first time interval according to the second time interval and the third time interval between the target sidelink channel and the PSFCH includes: determining a sum of the second time interval and the third time interval as the first time interval; determining a sum of the second time interval and the third time interval which is scaled up or scaled down as the first time interval; or determining a sum of the third time interval and the the second time interval which is scaled up or scaled down as the first time interval.

In some embodiments, the determining the first time interval according to the second time interval and the third time interval between the target sidelink channel and the PSFCH includes: in a case that a sidelink subcarrier spacing SL SCS is the same as a Uu SCS, the first time interval is a sum of the second time interval and the third time interval; or in a case that the Uu SCS is a predetermined multiple of the SL SCS, the second time interval is scaled up or scaled down according to the predetermined multiple, and the first time interval is a sum of the second time interval which is scaled up or scaled down and the third time interval, where the predetermined multiple is greater than zero; or in a case that the Uu SCS is a predetermined multiple of the SL SCS, the third time interval is scaled up or scaled down according to the predetermined multiple, and the first time interval is a sum of the second time interval and the third time interval which is scaled up or scaled down, where the predetermined multiple is greater than zero.

In some embodiments, the Uu SCS is a PUCCH SCS or a physical uplink shared channel subcarrier spacing PUSCH SCS.

In some embodiments, in a case that there is no PSFCH at the position corresponding to the second time interval, the target sidelink channel transmission resource corresponding to the second time interval does not belong to the target sidelink channel transmission resource; or in a case that there is no PSFCH at the position corresponding to the second time interval, the target sidelink channel transmission resource corresponding to the second time interval belongs to the target sidelink channel transmission resource.

In some embodiments, a target physical sidelink feedback information bit corresponding to the target sidelink channel transmission resource is set to Negative ACKnowledgement (NACK) or ACKnowledgement (ACK) information.

In some embodiments, the determining the target physical sidelink feedback information includes: determining the target sidelink feedback information according to feedback information corresponding to the target sidelink channel transmission resource.

In some embodiments, before determining the target physical sidelink feedback information, the processing module 1010 is further configured to: determine, according to at least one dimension of the target sidelink channel transmission resource, the feedback information corresponding to the target sidelink channel transmission resource, where the at least one dimension of the target sidelink channel transmission resource includes: at least one of frequency domain, code domain, spatial domain, or time domain.

In some embodiments, the processing module 1010 is further configured to: before determining the target physical sidelink feedback information, obtain a first feedback time and/or a second feedback time; and obtain the first time interval and/or the second time interval according to the first feedback time and/or the second feedback time.

In some embodiments, the target sidelink channel includes a Physical Sidelink Shared CHannel (PSSCH) and/or a Physical Sidelink Control CHannel (PSCCH).

For the communication device 1000 according to the embodiments of the present disclosure, refer to the flow corresponding to the methods 100 to 600 according to the embodiments of the present disclosure. Furthermore, each unit/module of the communication device 1000 and the foregoing other operations and/or functions are used to implement the corresponding flow of the methods 100 to 600, can achieve the same or equivalent technical effect, and will no longer be described here for the purpose of brevity.

Embodiment 10

Figure 11:
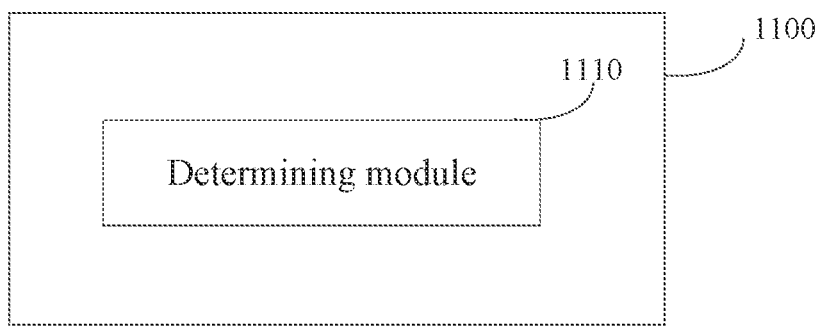
FIG. 11 is a schematic structural diagram of a communication device according to another embodiment of the present disclosure.

FIG. 11 is a schematic structural diagram of a communication device according to an embodiment of the present disclosure. As shown in the figure, the communication device 1100 includes: a determining module 1110.

The determining module 1110 is configured to: determine, according to a first feedback time and/or a second feedback time, a target sidelink channel transmission resource associated with a target uplink channel.

In some embodiments, the determining module 1110 is configured to determine, according to a resource location of the target uplink channel and the first feedback time, the target sidelink channel transmission resource corresponding to the target uplink channel; or determine a feedback time period according to a resource location of the target uplink channel, the first feedback time, and the second feedback time, and determine, according to the feedback time period, the target sidelink channel transmission resource corresponding to the target uplink channel; or determine a feedback time period according to a resource location of the target uplink channel and the second feedback time, and determine, according to the feedback time period, the target sidelink channel transmission resource corresponding to the target uplink channel.

In some embodiments, in a case that the target sidelink channel transmission resource corresponding to the target uplink channel is determined according to the feedback time period, each target time in the feedback time period corresponds to at least one target physical sidelink feedback information bit.

In some embodiments, in the target time, the target sidelink channel transmission resource is included.

In some embodiments, the target sidelink channel transmission resource is determined according to a first time interval, and the first time interval is a time interval between the target sidelink channel transmission resource and the target uplink channel.

In some embodiments, the first time interval is determined according to a second time interval, and the second time interval is a time interval between a target physical sidelink feedback channel PSFCH and the target uplink channel.

In some embodiments, the target sidelink channel transmission resource is determined according to a fourth time interval, where the fourth time interval is a time interval between a target PSSCH and the target uplink channel, or a time interval between a target PSCCH and the target uplink channel.

In some embodiments, the target sidelink channel includes: at least one of a PSSCH, a PSCCH, or a PSFCH.

For the network device 1100 according to the embodiments of the present disclosure, refer to the flow corresponding to the methods 700 to 900 according to the embodiments of the present disclosure. Furthermore, each unit/module of the network device 1100 and the foregoing other operations and/or functions are used to implement the corresponding procedure of the methods 700 to 900, can achieve the same or equivalent technical effect, and will no longer be described here for the purpose of brevity.

Embodiment 11

Figure 12:
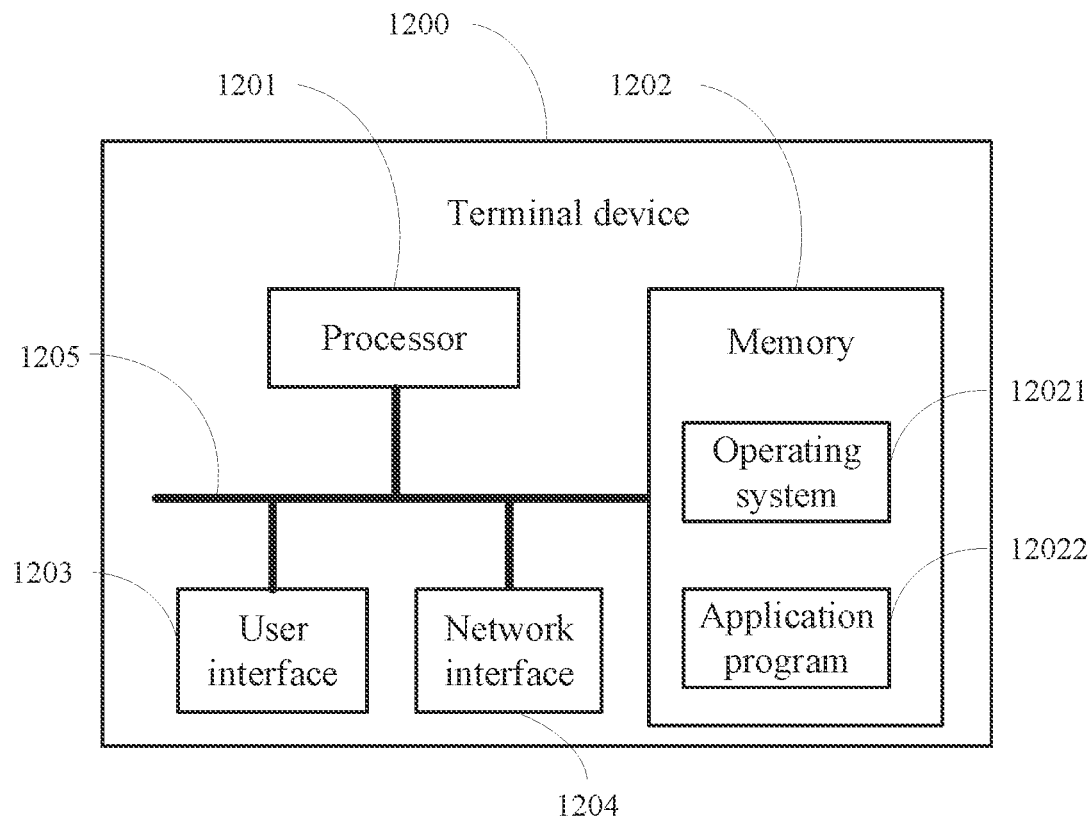
FIG. 12 is a block diagram of a terminal device according to an embodiment of the present disclosure.

FIG. 12 is a block diagram of a terminal device according to another embodiment of the present disclosure. The communication device described in the embodiment of the present disclosure may be a terminal device. The terminal device 1200 shown in FIG. 12 includes at least one processor 1201, a memory 1202, at least one network interface 1204, and a user interface 1203. All components in the terminal device 1200 are coupled together through a bus system 1205. It can be understood that the bus system 1205 is configured to implement connection and communication between these components. In addition to a data bus, the bus system 1205 may include a power bus, a control bus, and a status signal bus. However, for clear description, various buses are marked as the bus system 1205 in FIG. 12.

The user interface 1203 may include a display, a keyboard, a clicking device (for example, a mouse, a trackball), a touch panel, or a touchscreen.

It can be understood that the memory 1202 in this embodiments of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DRRAM). The memory 1202 in the system and the method that are described in the embodiments of the present disclosure is to include but is not limited to these memories and any other suitable types of memories.

In some implementations, the memory 1202 stores the following elements: an executable module or a data structure, a subset thereof, or an extension set thereof: an operating system 12021 and an application program 12022.

The operating system 12021 includes various system programs, such as a framework layer, a core library layer, a driver layer, and the like, and is configured to implement various base station's services and process hardware-based tasks. The application program 12022 includes various application programs, for example, a media player and a browser, and is used to implement various application services. A program for implementing the method in the embodiments of the present disclosure may be included in the application 12022.

In the embodiments of the present disclosure, the terminal device 1200 further includes a computer program stored in the memory 1202 and executable on the processor 1201, and when the computer program is executed by the processor 1201, the steps of the methods 100 to 600 or the methods 700 to 900 are implemented.

The method disclosed in the foregoing embodiment of the present disclosure may be applied to the processor 1201, or implemented by the processor 1201. The processor 1201 may be an integrated circuit chip having a signal processing capability. During implementation, each step of the foregoing method may be completed by using an integrated logic circuit of hardware in the processor 1201 or an instruction in a form of software. The processor 1201 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 1202, and the processor 1201 reads information in the memory 1202 and completes the steps in the foregoing method in combination with hardware of the processor. For example, the computer-readable storage medium stores a computer program, and when the computer program is executed by the processor 1201, the steps of the methods 100 to 600 or the methods 700 to 900 are implemented.

It can be understood that the embodiments described in the present disclosure may be implemented by hardware, software, firmware, middleware, microcode, or a combination thereof. For implementation with hardware, a processing unit can be implemented in one or more Application Specific Integrated Circuits (ASIC), a Digital Signal Processor (DSP), a DSP Device (DSPD), a Programmable Logic Device (PLD), a Field-Programmable Gate Array (PFGA), general processors, controllers, micro-controllers, microprocessors, and another electronic unit for implementing the functions of the present application, or their combinations.

For implementation with software, technologies described in the embodiments of the present disclosure may be implemented by using a module (for example, a process or a function) that performs the function in the embodiments of the present disclosure. A software code may be stored in the memory and executed by the processor. The memory may be implemented in the processor or outside the processor.

The terminal device 1200 can implement the steps of the methods 100 to 600 or the methods 700 to 900 in the foregoing embodiments, and can achieve the same or equivalent technical effect. To avoid repetition, details are not described herein again.

Figure 13:
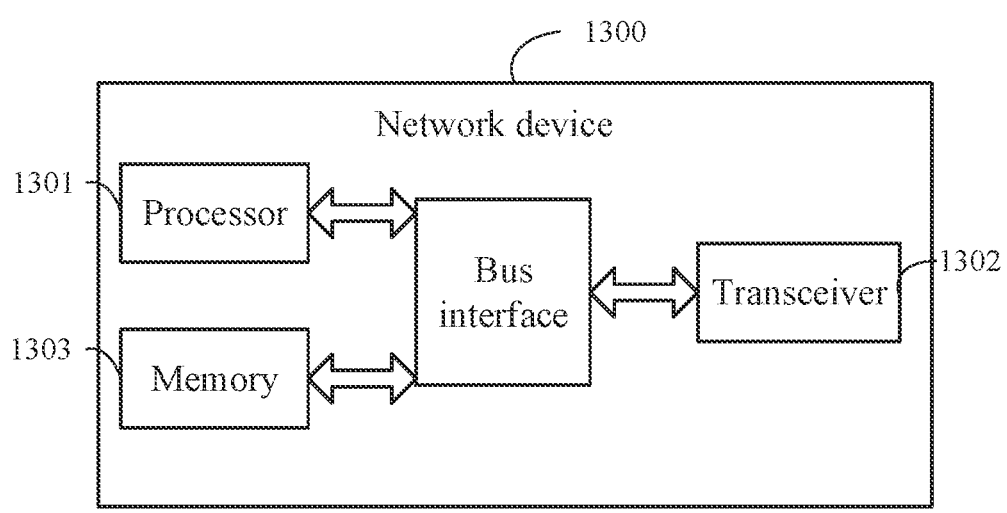
FIG. 13 is a structural diagram of a network device according to an embodiment of the present disclosure.

Referring to FIG. 13, FIG. 13 is a structural diagram of a network device to which an embodiment of the present disclosure is applied. The communication device in the embodiments of the present disclosure may be a network device, and can implement the details of the methods 100 to 600 or the methods 700 to 900 in the foregoing embodiments, and can achieve the same or equivalent technical effect. As shown in FIG. 13, a network device 1300 includes a processor 1301, a transceiver 1302, a memory 1303, and a bus interface.

In the embodiments of the present disclosure, the network device 1300 further includes: a computer program stored in the memory 1303 and executable on the processor 1301, and when the computer program is executed by the processor 1301, the steps of the methods 100 to 600 or the methods 700 to 900 are implemented.

In FIG. 13, a bus architecture may include any quantity of interconnected buses and bridges, and is specifically linked by various circuits of one or more processors represented by the processor 1301 and a memory represented by the memory 1303. The bus architecture may further link various other circuits such as a peripheral device, a voltage regulator, and a power management circuit together. These are all well-known in the art, and therefore are not further described in this specification. The bus interface provides interfaces. The transceiver 1302 may be a plurality of components. To be specific, the transceiver includes a transmitter and a receiver, and provides a unit configured to communicate with various other apparatuses on a transmission medium.

The processor 1301 is responsible for managing the bus architecture and common processing, and the memory 1303 may store data used when the processor 1301 performs an operation.

An embodiment of the present disclosure further provides a computer-readable storage medium. The computer-readable storage medium stores a computer program. When the computer program is executed by a processor, the processes of the methods 100 to 600 or the methods 700 to 900 in the foregoing embodiments are implemented, and a same technical effect can be achieved. To avoid repetition, details are not described herein again. The computer-readable storage medium is, for example, a Read-Only Memory (ROM), a Random Access Memory (RAM), a magnetic disk, or an optical disk.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A physical sidelink feedback information determining method, wherein the method is performed by a communication device and comprises:
   determining target physical sidelink feedback information according to a target sidelink channel transmission resource associated with a target uplink channel, wherein the target sidelink channel transmission resource is determined according to a first time interval, and the first time interval is a time interval between the target sidelink channel transmission resource and the target uplink channel, a target sidelink channel of the target sidelink channel transmission resource comprises a Physical Sidelink Shared CHannel (PSSCH) or a Physical Sidelink Control CHannel (PSCCH),
   wherein the first time interval is determined according to a second time interval, and the second time interval is a time interval between a target Physical Sidelink Feedback CHannel (PSFCH) and the target uplink channel.

2. The method according to claim 1, wherein the determining the target physical sidelink feedback information comprises:
   determining the target sidelink feedback information according to feedback information corresponding to the target sidelink channel transmission resource.

3. The method according to claim 1, wherein the determining the first time interval according to the second time interval comprises:
   determining the first time interval according to the second time interval and a third time interval between a target sidelink channel and the PSFCH.

4. The method according to claim 3, wherein the third time interval is determined according to at least one of a minimum time interval between the target sidelink channel and the PSFCH, or a period of the PSFCH.

5. The method according to claim 3, wherein the determining the first time interval according to the second time interval and a third time interval between a target sidelink channel and the PSFCH comprises: determining a sum of the third time interval and the second time interval which is scaled up or scaled down as the first time interval.

6. The method according to claim 1, wherein when there is no PSFCH at a position corresponding to the second time interval, a target sidelink channel transmission resource corresponding to the second time interval does not belong to the target sidelink channel transmission resource.

7. A communication device, comprising:
   a memory storing computer-readable instructions; and
   a processor coupled to the memory and configured to execute the computer-readable instructions, wherein the computer-readable instructions, when executed by the processor, cause the processor to perform operations comprising:
   determining target physical sidelink feedback information according to a target sidelink channel transmission resource associated with a target uplink channel, wherein the target sidelink channel transmission resource is determined according to a first time interval, and the first time interval is a time interval between the target sidelink channel transmission resource and the target uplink channel, a target sidelink channel of the target sidelink channel transmission resource comprises a Physical Sidelink Shared CHannel (PSSCH) or a Physical Sidelink Control CHannel (PSCCH),
   wherein the first time interval is determined according to a second time interval, and the second time interval is a time interval between a target Physical Sidelink Feedback CHannel PSFCH) and the target uplink channel.

8. The communication device according to claim 7, wherein the determining the target physical sidelink feedback information comprises:
   determining the target sidelink feedback information according to feedback information corresponding to the target sidelink channel transmission resource.

9. The communication device according to claim 7, wherein when there is no PSFCH at a position corresponding to the second time interval, a target sidelink channel transmission resource corresponding to the second time interval does not belong to the target sidelink channel transmission resource.

10. The communication device according to claim 7, wherein the determining the first time interval according to the second time interval comprises:

determining the first time interval according to the second time interval and a third time interval between a target sidelink channel and the PSFCH.

11. The communication device according to claim 10, wherein the third time interval is determined according to at least one of a minimum time interval between the target sidelink channel, or the PSFCH and a period of the PSFCH.

12. The communication device according to claim 10, wherein the determining the first time interval according to the second time interval and a third time interval between a target sidelink channel and the PSFCH comprises:

determining a sum of the third time interval and the second time interval which is scaled up or scaled down as the first time interval.

13. A non-transient computer-readable storage medium, wherein the non-transient computer-readable storage medium stores a computer program, and when the computer program is executed by a processor, cause the processor to perform operations comprising:

determining target physical sidelink feedback information according to a target sidelink channel transmission resource associated with a target uplink channel, wherein the target sidelink channel transmission resource is determined according to a first time interval, and the first time interval is a time interval between the target sidelink channel transmission resource and the target uplink channel, a target sidelink channel of the target sidelink channel transmission resource comprises a Physical Sidelink Shared CHannel (PSSCH) or a Physical Sidelink Control CHannel (PSCCH), wherein the first time interval is determined according to a second time interval, and the second time interval is a time interval between a target Physical Sidelink Feedback CHannel (PSFCH) and the target uplink channel.

14. The non-transient computer-readable storage medium according to claim 13, wherein the determining the first time interval according to the second time interval comprises:

determining the first time interval according to the second time interval and a third time interval between a target sidelink channel and the PSFCH.

15. The non-transient computer-readable storage medium according to claim 14, wherein the third time interval is determined according to at least one of a minimum time interval between the target sidelink channel and the PSFCH or a period of the PSFCH.

16. The non-transient computer-readable storage medium according to claim 14, wherein the determining the first time interval according to the second time interval and a third time interval between a target sidelink channel and the PSFCH comprises:

determining a sum of the third time interval and the second time interval which is scaled up or scaled down as the first time interval.

17. The non-transient computer-readable storage medium according to claim 13, wherein when there is no PSFCH at a position corresponding to the second time interval, a target sidelink channel transmission resource corresponding to the second time interval does not belong to the target sidelink channel transmission resource.

* * * * *